United States Patent [19]

Weber et al.

[11] Patent Number: 4,927,859

[45] Date of Patent: May 22, 1990

[54] EXPANDABLE POLYMERS IN PARTICLE FORM

[75] Inventors: Heinz Weber, Gruenstadt; Eckhard Nintz, Ludwigshafen; Manfred Walter, Speyer; Dieter Ballweber, Frankenthal; Bertram Ostermayer, Roedersheim-Gronau, all of Fed. Rep. of Germany

[73] Assignee: BASF Aktiengesellschaft, Ludwigshafen, Fed. Rep. of Germany

[21] Appl. No.: 354,230

[22] Filed: May 19, 1989

[30] Foreign Application Priority Data

May 25, 1988 [DE] Fed. Rep. of Germany ....... 3817631

[51] Int. Cl.$^5$ ............................................... C08J 9/18
[52] U.S. Cl. ..................................... 521/59; 521/56; 521/58; 521/60; 521/139; 521/910
[58] Field of Search ................. 521/139, 60, 56, 59, 521/58, 910

[56] References Cited

U.S. PATENT DOCUMENTS

| | | | |
|---|---|---|---|
| 4,274,637 | 6/1981 | Molitor | 521/139 |
| 4,705,811 | 11/1987 | Park | 521/139 |
| 4,727,093 | 2/1988 | Allen et al. | 521/180 |
| 4,728,674 | 3/1988 | Wroczynski | 521/180 |
| 4,734,441 | 3/1988 | Park | 521/139 |
| 4,857,390 | 8/1989 | Allen et al. | 521/139 |

FOREIGN PATENT DOCUMENTS 0241258 10/1987 European Pat. Off. .
3220856 3/1979 Fed. Rep. of Germany .

*Primary Examiner*—Morton Foelak
*Attorney, Agent, or Firm*—Oblon, Spivak, McClelland, Maier & Neustadt

[57] ABSTRACT

Expandable polymers in particle form for the preparation of foams having high heat distortion resistance contain from 20 to 94.9% by weight of a styrene polymer, from 0.1 to 75% by weight of a polyphenylene ether and from 5 to 20% by weight of a blowing agent mixture of aliphatic or cycloaliphatic hydrocarbons on the one hand and aromatic hydrocarbons, alcohols, ketones, ethers, esters and/or chlorohydrocarbons on the other hand.

4 Claims, No Drawings

EXPANDABLE POLYMERS IN PARTICLE FORM

The present invention relates to novel expandable polymers in particle form which are suitable for the production of foam moldings of any shape having high heat distortion resistance.

Polystyrene foams have become very important in the market for insulating materials and packaging materials. However, they have unsatisfactory heat distortion resistance.

DE-A No. 32 20 856 discloses a process for the preparation of foams having high heat distortion resistance, in which a mixture from 95 to 20% by weight of a styrene polymer and from 5 to 80% by weight of a polyphenylene ether is mixed in the melt with pentane and the mixture is then extruded. However, foams of this type can only be produced in the form of extrudates or sheets. The process is unsuitable for the production of foam moldings of any desired shape.

EP-A No. 241 258 discloses a process for the preparation of foams having particularly low density, in which a mixture of not less than 50% by weight of polystyrene, from 0.06 to 15% by weight of a polyphenylene ether and from 0.05 to 3% by weight of an aromatic phosphate is mixed in the melt with a fluorochlorohydrocarbon as a blowing agent and the mixture is then extruded. The aromatic phosphate acts as a plasticizer and leads to foams having unsatisfactory heat distortion resistance. The fluorochlorohydrocarbons used as blowing agents pollute the environment, since they damage the ozone layer of the atmosphere. Furthermore, the extrusion process is unsuitable for the production of foam moldings of any desired shape.

It is an object of the present invention to provide an expandable polymer in particle form from which it is possible to obtain, by expansion, foam particles which can be further processed by welding to give moldings of any desired shape which have high heat distortion resistance. It is a further object of the present invention to provide expandable polymers in particle form which, when expanded, give foam particles having a particularly low bulk density and which can be pre-expanded at a high throughput per unit time. It is a further object of the present invention to provide a process for the preparation of an expandable polymer in particle form, which can be carried out at relatively low temperatures and under low pressures.

We have found, surprisingly, that these objects are achieved by an expandable polymer in particle form which is based on styrene polymers and polyphenylene ethers and contains, as a blowing agent, a mixture of aliphatic or cycloaliphatic hydrocarbons on the one hand and aromatic hydrocarbons, alcohols, ketones, ethers, esters and/or chlorohydrocarbons on the other hand.

The present invention accordingly provides expandable polymers in particle form, containing
(a) from 20 to 94.9% by weight of a styrene polymer,
(b) from 0.1 to 75% by weight of a polyphenylene ether,
(c) from 5 to 20% by weight of a blowing agent mixture consisting of
  (c1) aliphatic or cycloaliphatic saturated hydrocarbons of 3 to 7 carbon atoms and
  (c2) an aromatic saturated hydrocarbon of 7 or 8 carbon atoms,
    an alcohol of 2 to 4 carbon atoms,
    a ketone of 3 to 5 carbon atoms,
    a cyclic ether of 4 to 6 carbon atoms,
    an aliphatic ether of 4 to 6 carbon atoms,
    an ester of 4 to 6 carbon atoms and/or
    a chlorohydrocarbon of 1 or 2 carbon atoms and 2 or 3 chlorine atoms in a weight ratio of c1: c2 of from 50:1 to 1:1, with or without
(d) conventional additives in effective amounts.

The present invention furthermore relates to a process for the preparation of such expandable polymers in particle form, in which an intimate mixture of (a) a styrene polymer, (b) a polyphenylene ether and, if required, (d) conventional additives in effective amounts, in particle form in aqueous suspension, is impregnated with (c) a blowing agent mixture consisting of
(c1) aliphatic or cycloaliphatic saturated hydrocarbons of 3 to 7 carbon atoms and
(c2) an aromatic saturated hydrocarbon of 7 or 8 carbon atoms,
  an alcohol of 2 to 4 carbon atoms,
  a ketone of 3 to 5 carbon atoms,
  a cyclic ether of 4 to 6 carbon atoms,
  an aliphatic ether of 4 to 6 carbon atoms,
  an ester of 4 to 6 carbon atoms and/or
  a chlorohydrocarbon of 1 or 2 carbon atoms and 2 or 3 chlorine atoms at from 100° to 250° C. and under superatmospheric pressure.

The present invention furthermore relates to a process for the preparation of foam particles having a density of from 5 to 200 kg/m$^3$, in which either the hot suspension obtained in the preparation of the expandable polymers is let down into an atmosphere under low pressure or the suspension is cooled and the particles that contain blowing agent are then isolated and are expanded by treatment with a hot gas.

For the purposes of the present invention, styrene polymers are polystyrene and copolymers of styrene which contain not less than 50% by weight of styrene as copolymerized units. Examples of suitable comonomers are α-methylstyrene, styrenes halogenated in the nucleus, acrylonitrile, esters of (meth)acrylic acid of 1 to 8 carbon atoms, N-vinylcarbazole, maleic anhydride and/or small amounts of compounds having two polymerizable double bonds, such as butadiene, divinylbenzene or butanediol diacrylate.

For the purposes of the present invention, styrene polymers are furthermore the high impact polystyrenes, i.e. polymers which contain not less than 50% by weight of copolymerized styrene and, as a grafting base or in a finely divided state, a rubber, such as polybutadiene, polyisoprene, styrene/butadiene rubber, acrylate rubber or the like. Thus, all commercial ABS and ASA styrene copolymers are also suitable.

The expandable polymers contain the styrene polymer in general in an amount of from 20 to 94.9, preferably from 30 to 93, in particular from 40 to 80, % by weight.

A preferably used polyphenylene ether is the commercial poly(2,6-dimethyl-1,4-phenylene oxide), which is used in an amount of from 0.1 to 75, preferably from 2 to 65, % by weight. When up to 10% by weight are used, the resulting products give, on expansion, foam particles having a particularly low bulk density. The heat distortion resistance of the foams produced from the products increases with increasing content of polyphenylene ether.

The expandable polymers of the invention contain, as a blowing agent, a mixture of a component (c1) having only an insignificant plasticizing effect and a component (c2) having an important plasticizing effect. Aliphatic or cycloaliphatic saturated hydrocarbons of 3 to 7 carbon atoms, such as propane, butane, n-pentane, isopentane, hexane, heptane, cyclohexane or methylcyclohexane, or mixtures of these are used as component (c1). Aromatic saturated hydrocarbons of 7 or 8 carbon atoms, such as toluene or xylene, alcohols of 2 to 4 carbon atoms, such as ethanol, propanol, isopropanol, n-butanol, isobutanol or tert-butanol, ketones of 3 to 5 carbon atoms, such as acetone, methyl ethyl ketone or diethyl ketone, cyclic ethers of 4 to 6 carbon atoms, such as dioxane, dimethyldioxane or tetrahydrofuran, aliphatic ethers of 4 to 6 carbon atoms, such as diethyl ether or diisopropyl ether, esters of 4 to 6 carbon atoms, such as ethyl acetate, methyl propionate, propyl acetate or butyl acetate, and/or chlorohydrocarbons of 1 or 2 carbon atoms and 2 or 3 chlorine atoms, such as methylene chloride, chloroform, dichloroethane or trichloroethane, and mixtures of the stated substances are used as component (c2).

The blowing agent is present in the expandable polymers in an amount of from 5 to 20, preferably from 7 to 18, % by weight. The weight ratio of component (c1) to component (c2) is from 50:1 to 1:1, preferably from 20:1 to 2:1.

The plasticizing blowing agent component (c2) reduces the softening point of the mixture of styrene polymer and polyphenylene oxide and thus makes it possible to reduce the temperature at which the polymer mixture is impregnated with the blowing agent. The reduction of this preparation temperature is also associated with a corresponding reduction in the pressure during impregnation.

Component (c2) also reduces the softening point of the expandable polymers and permits expansion at a lower temperature and with a higher throughput per unit time. After expansion of the expandable polymers, the foam particles still contain, as a rule, small amounts of the blowing agent component (c2). They can therefore be particularly readily welded to give moldings.

The expandable polymers may furthermore contain conventional assistants in the usual effective amounts, e.g. dyes, pigments, antistatic agents, lubricants, flameproofing agents and fillers.

Examples of suitable flameproofing agents are hexabromocyclododecane, monochloropentabromocyclohexane, trisnonylphenyl phosphite and triphenylphosphine oxide.

Flameproofing agents are generally used in an effective amount of from 0.5 to 8, preferably from 2 to 6, % by weight, based on the sum of the polymers (a) and (b).

The individual components are virtually homogeneously distributed in the expandable polymers. The said polymers are in the form of particles and are, as a rule, spherical, bead-like or drop-like. They generally have a mean diameter of from 0.2 to 4, preferably from 0.3 to 3, mm.

The novel expandable polymers are prepared by impregnating the styrene polymer/polyphenylene ether particles in aqueous suspension with the blowing agent mixture at elevated temperatures and under superatmospheric pressure.

This procedure starts from an intimate mixture of styrene polymer with the polyphenylene ether and, if required, additives, as is obtained, for example, by mixing the components in an extruder. The mixture should be in particle form and have a mean diameter of from 0.2 to 4, preferably from 0.3 to 3, mm. The granules obtainable by hot face cutting or cold face cutting of the extrudates are suitable for this purpose.

Impregnation with the blowing agent is carried out in a pressure-resistant stirred vessel. The procedure is carried out in aqueous suspension, in general using from 90 to 350, preferably from 100 to 300, parts of water per 100 parts of polymer.

To prevent sticking of the polymer particles, the procedure is advantageously carried out in the presence of known suspending agents, such as very finely divided alumina, basic magnesium carbonate, basic zinc carbonate, calcium carbonate, calcium phosphate or kieselguhr. Furthermore, conventional water-soluble polymers which considerably increase the viscosity of the aqueous phase, e.g. polyvinylpyrrolidone and polyvinyl alcohol, are suitable dispersants. The finely divided emulsion polymer of the liquid phase (serum) of a styrene emulsion polymerization is also suitable.

The dispersant is used in general in amounts of from 0.1 to 10, preferably from 0.1 to 4.0, parts per 100 parts of water.

The dispersion is heated together with the blowing agent to a temperature at which the polymer softens. In the presence of the blowing agent, some or all of which diffuses into the polymer particles at as low as room temperature or during the heating process, this softening temperature is, as a rule, lower than the softening temperature of the pure polymer mixture. The optimum temperature can easily be determined by a preliminary experiment. It is from 100° to 250° C. The pressure during the impregnation is essentially determined by the vapor pressure of the water and of the blowing agent and is in general from 8 to 60 bar.

After the softening point has been reached, the dispersion is kept at this temperature for some time, for example from 1 to 100 minutes. Thereafter, it is cooled, and the expandable polymer is isolated from the suspension, if necessary after washing and drying.

However, foam particles can also be produced directly, without intermediate isolation of the expandable polymers, by discharging the hot dispersion from the lower end of the pressure kettle and letting down the dispersion while keeping the pressure and the temperature in the kettle virtually constant. The particles expand spontaneously when let down to low pressure. They are then isolated from the aqueous phase and if necessary washed and dried.

Foam particles are also obtained when the expandable polymer is treated with a hot gas, for example with steam or heated nitrogen or air. The temperature of the gas is above the softening point of the expandable polymers. For PPE contents of up to about 30%, expansion can be carried out in a conventional expander at steam temperatures of about 100° C. Higher PPE contents require steam temperatures of up to 180° C. and preheated preexpanders.

After cooling, the foam particles can be further expanded by treating them once again or several times more with hot gas. The density of the resulting foam particles is from 5 to 200, in particular from 10 to 100, kg/m$^3$.

The foam particles obtained are very suitable for the production of foam moldings of any desired shape. For this purpose, they are introduced in a conventional manner into a mold which does not have a gas-tight seal, and are heated therein to above the softening point. During this procedure, the particles soften, expand and become welded to form a molding which conforms to the shape of the inside of the mold.

The foam particles and the moldings produced therefrom have good heat distortion resistance and a low density. They are used as insulating materials and packaging and for a number of further applications where heat insulation and cold insulation, high rigidity, heat distortion resistance and low density are desirable.

In the Examples, parts are by weight.

EXAMPLES 1 TO 4

100 parts of polystyrene/polyphenylene ether granules having the composition stated in Table 1 and a mean particle diameter of 1.2 mm are introduced together with 120 parts of water and 1.5 parts of tricalcium phosphate powder and 0.15 part of sodium dodecylbenzenesulfonate into a pressure kettle. The entire mixture is heated to 125° C. while stirring and, when the temperature is reached, tetrahydrofuran and pentane (~75% of n-pentane and 25% of isopentane) are metered in subsequently as blowing agent in the course of 2 hours. The mixture is then kept at 125° C. for 8 hours, after which it is cooled and the particles are separated from the aqueous phase. To eliminate the excess tricalcium phosphate adhering to the particles, the latter are washed with 30% strength nitric acid. The particles are washed neutral and then dried in a stream of air. The properties of the resulting particles are summarized in Table 2.

EXAMPLES 5 AND 6

The experiments are carried out similarly to Example 1, except that, instead of tetrahydrofuran, diisopropyl ether is used as the plasticizing blowing agent (Table 1). The properties of the resulting products are summarized in Table 2.

EXAMPLES 7 AND 8

The experiments are carried out similarly to Example 1, except that, instead of tetrahydrofuran, methyl ethyl ketone is used as the plasticizing blowing agent and the impregnating temperature is increased to 130° C. Details are shown in Table 1. The expansion properties of the granules containing blowing agent are summarized in Table 2.

EXAMPLES 9 AND 10

The experiments are carried out similarly to Examples 1 to 4, except that, instead of tetrahydrofuran, n-butyl acetate is used as the plasticizing blowing agent (Table 1) and the impregnating temperature is kept at 120° C. The properties of the resulting products are summarized in Table 2.

COMPARATIVE EXAMPLE 11

The experiment is carried out similarly to Example 7, except that subsequent impregnation is carried out using only pentane, without the addition of a plasticizing blowing agent (2). The resulting material has poorer expansion properties, characterized by an increased bulk density of the expanded particles. Details are shown in Table 2.

To determine the heat distortion resistance, the foam moldings are each kept at 80° C. in a drying oven for 3 days in order to expel residual plasticizer.

TABLE 1

| | Composition of the Mixtures | | | | |
|---|---|---|---|---|---|
| Example | Composition of the polymer mixture | Suspending Agent | Blowing Agent (1) | Plasticizing Blowing Agent (2) | Maximum impregnating temperature |
| 1 | 30% of polyphenylene ether 70% of polystyrene | tricalcium phosphate powder + Na dodecyl-benzene sulfonate | 10% of pentane | 3% of tetrahydrofuran | 125° C. |
| 2 | 18% of polyphenylene ether 82% of polystyrene | tricalcium phosphate powder + Na dodecyl-benzene sulfonate | 10% of pentane | 2% of tetahydrofuran | " |
| 3 | 14% of polyphenylene ether 86% of polystyrene | tricalcium phosphate powder + Na dodecyl-benzene sulfonate | 10% of pentane | 2% of tetahyrofuran | " |
| 4 | 10% of polyphenylene ether 90% of polystyrene | tricalcium phosphate powder + Na dodecyl-benzene sulfonate | 10% of pentane | 0.5% of tetrahydrofuran | " |
| 5 | 30% of polyphenylene ether 70% of polystyrene | tricalcium phosphate powder + Na dodecyl-benzene sulfonate | 10% of pentane | 2% of diispropyl ether | " |
| 6 | 30% of polyphenylene ether 70% of polystyrene | tricalcium phosphate powder + Na dodecyl-benzene sulfonate | 10% of pentane | 1% of diisopropyl ether | " |
| 7 | 30% of polyphenylene ether 70% of polystyrene | tricalcium phosphate powder + Na dodecyl-benzene sulfonate | 10% of pentane | 2% of methyl ethyl ketone | 130° C. |
| 8 | 30% of polyphenylene ether | tricalcium | 10% of | 1% of | " |

TABLE 1-continued

Composition of the Mixtures

| | Composition of the polymer mixture | Suspending Agent | Blowing Agent (1) | Plasticizing Blowing Agent (2) | Maximum impregnating temperature |
|---|---|---|---|---|---|
| 9 | 30% of polyphenylene ether 70% of polystyrene | phosphate powder + Na dodecyl-benzene sulfonate tricalcium phosphate powder + Na dodecyl-benzene sulfonate | pentane 10% of pentane | methyl ethyl ketone 2% of n-butyl acetate | 120° C. |
| 10 | 30% of polyphenylene ether 70% of polystyrene | tricalcium phosphate powder + Na dodecyl-benzene sulfonate | 10% of pentane | 1% of n-butyl acetate | " |
| Comp. Example | | | | | |
| 11 | 30% of polyphenylene ether 70% of polystyrene | tricalcium phosphate powder + Na dodecyl-benzene sulfonate | 15% of pentane | — | 130° C. |

TABLE 2

Properties of raw materials and expansion properties of the expandable polyphenylene ether/polystyrene mixtures

| | Glowing agent content (1) | Content of plasticizing blowing agent (2) | Expansion temp. °C. first expansion | Bulk density after first expansion g/l | Expansion temp. °C. second expansion | Bulk density after second expansion g/l | Production of moldings using steam gage pressure (bar) | Welding of moldings % | Density of molding g/l | Heat distortion resistance DIN 53,424 (pressure tent) 2° C. |
|---|---|---|---|---|---|---|---|---|---|---|
| Example | | | | | | | | | | |
| 1 | 8.6% of pentane | 1.9% of tetrahydrofuran | 101 | 50.4 | 106 | 41.8 | 1.2 | 70% | 48.2 | 141 |
| 2 | 8.5% of pentane | 1.4% of tetrahydrofuran | 101 | 31.6 | 106 | 25.9 | 1.0 | 70% | 29.8 | 125 |
| 3 | 9.4% of pentane | 1.2% of tetrahydrofuran | 101 | 20.7 | 106 | 15.5 | 0.8 | 80% | 19.8 | 121 |
| 4 | 8.8% of pentane | 0.3% of tetrahydrofuran | 101 | 19.9 | 106 | 14.2 | 0.8 | 80% | 18.2 | 115 |
| 5 | 7.8% of pentane | 1.6% of diisopropyl ether | 101 | 59.8 | 106 | 44.2 | 1.2 | 60% | 42.8 | 155 |
| 6 | 7.4% of pentane | 0.7% of diisopropyl ether | 101 | 63.1 | 106 | 47.1 | 1.2 | 60% | 46.2 | 153 |
| 7 | 7.6% of pentane | 0.7% of methyl ethyl ketone | 101 | 64.2 | 106 | 49.4 | 1.2 | 60% | 48.2 | 154 |
| 8 | 7.4% of pentane | 0.4% of methyl ethyl ketone | 101 | 70.8 | 106 | 50.8 | 1.2 | 60% | 49.7 | 152 |
| 9 | 8.2% of pentane | 1.8% of n-butyl acetate | 101 | 60.5 | 106 | 44.3 | 1.2 | 70% | 42.8 | 149 |
| 10 | 7.8% of pentane | 0.8% of n-butyl acetate | 101 | 64.3 | 106 | 46.2 | 1.2 | 60% | 45.1 | 151 |
| Comp. Example | | | | | | | | | | |
| 11 | 7.4% of pentane | | 101 | 87.4 | 106 | 71.2 | 1.4 | 20% | 70.6 | 153 |

EXAMPLES 12 TO 14

270 parts of water, 6 parts of the dispersant tricalcium phosphate and 0.03 part of sodium dodecylbenzenesulfonate, as a surfactant, are introduced into a pressure-resistant stirred vessel. 100 parts of a polymer mixture granulated to a particle weight of 1.7 mg and consisting of 60% by weight of polyphenylene ether and 40% by weight of a high impact polystyrene which contains 9% of butadiene rubber are added to the stirred mixture. The polymer mixture has a melt flow index of 7 [g/10 min], measured at 250° C./21.6 kg.

After the addition of the stated plasticizing blowing agent component (c2), 21 parts of n-butane are forced in, the mixture is heated to the stated impregnating temperature and this temperature is maintained for 30 minutes. The content of the vessel is let down at this temperature in the course of a few hours into a collecting vessel, while subsequently forcing in nitrogen.

The resulting foam particles are treated with nitric acid to remove the tricalcium phosphate and are finally washed neutral and dried.

| Example | Parts | Blowing agent c2 | Impregnating temp. °C. | Bulk density Immediately | Bulk density After post-expansion g/l |
|---|---|---|---|---|---|
| 12 (comparison) | — | — | 177 | 115 | — |
| 13 | 5 | iso-butanol | 177 | 84 | 58 |
| 14 | 5 | iso-propanol | 185 | 50 | 35 |

The directly formed foam particles can be postexpanded expanded to lower bulk densities with superheated steam at 175° C. in the course of 1.5 minutes in an expander preheated to 170° C.

EXAMPLES 15 TO 17

The procedure described in Examples 12 to 14 is followed, except that a polymer mixture of 75% by weight of polyphenylene ether and polystyrene having a melt flow index of 2.4 [g/10 min] is used.

| Example | Parts | Blowing agent c2 | Impregnating temperature °C. | Bulk density g/l |
|---|---|---|---|---|
| 15 (comparison) | — | — | 195 | 128 |
| 16 | 1 | p-xylene | 195 | 63 |
| 17 | 1 | p-xylene | 206 | 52 |

EXAMPLES 18 TO 21

180 parts of filtered serum from a polystyrene suspension polymerization carried out using polyvinylpyrrolidone as a surfactant are introduced into a pressure-resistant stirred vessel; 0.8% by weight of styrene emulsion polymer is also present therein. 0.2 part of sodium pyrophosphate and 100 parts of the granulated polymer mixture described in Examples 12 to 14 and comprising polyphenylene ether and high impact polystyrene are added, as are 14 parts of a 75:25 n-pentane/isopentane mixture or n-heptane, as blowing agent (c1), and if required plasticizing blowing agent (c2). The stirred mixture is heated to, for example, 235° C. and this temperature is maintained for 30 minutes. After cooling, the expandable beads are washed with water and dried.

They are expanded in the course of 2 minutes in a pre-expander preheated to 170° C., through which steam superheated at 175° C. flows.

| Example | Blowing agent c1 | Parts | Blowing agent c2 | Impregnating temp. °C. | Blowing agent content of beads % by wt. | Bulk density (g/l) after pre-expansion with steam at 175° C. |
|---|---|---|---|---|---|---|
| 18 (comparison) | pentane | — | — | 235 | 7.9 | 41 |
| 19 | pentane | 4 | iso-propanol | 210 | 7.1 | 38 |
| 20 (comparison) | heptane | — | — | 235 | 10.8 | 30 |
| 21 | heptane | 4 | ethanol | 208 | 9.4 | 32 |

The foam particles obtained in Examples 13, 14, 15 and 17 to 21 are converted into moldings in the course of 3 minutes with steam superheated at 175° C., in molds which are not gas-tight and which are preheated to 170°–180° C. The cavities between the spherical particles are filled during the expansion process. Depending on the extent to which the mold is filled, the moldings obtained have gross densities of up to 10% below or up to 20% above the bulk density used, i.e. from 25 to 80 g/l.

For example, a molding which is produced from foam particles having a bulk density of 50 g/l (experiment 14) and which has a gross density of 55 g/l possesses a compressive strength of 0.4 MPa at 10% compression (DIN 53,421) and a heat distortion resistance of 171° C. (DIN 53,424).

We claim:
1. An expandable polymer in particle form, containing
   (a) from 20 to 94.9% by weight of a styrene polymer,
   (b) from 0.1 to 75% by weight of a polyphenylene ether,
   (c) from 5 to 20% by weight of a blowing agent mixture consisting of
      (c1) aliphatic or cycloaliphatic saturated hydrocarbons of 3 to 7 carbon atoms and
      (c2) an aromatic saturated hydrocarbon of 7 or 8 carbon atoms,
         an alcohol of 2 to 4 carbon atoms,
         a ketone of 3 to 5 carbon atoms,
         a cyclic ether of 4 to 6 carbon atoms,
         an aliphatic ether of 4 to 6 carbon atoms,
         an ester of 4 to 6 carbon atoms and/or a chlorohydrocarbon of 1 or 2 carbon atoms and 2 or 3 chlorine atoms in a weight ratio of c1:c2 of from 50:1 to 1:1, with or without
   (d) conventional additives in effective amounts.
2. An expandable polymer in particle form as claimed in claim 1, which has a mean particle diameter of from 0.2 to 4 mm.
3. An expandable polymer in particle form as claimed in claim 1, which contains from 30 to 93% by weight of component (a) and from 2 to 65% by weight of component (b).
4. A process for the preparation of an expandable polymer in particle form as claimed in claim 1, wherein an intimate mixture of (a) a styrene polymer, (b) a polyphenylene ether and, if required, (d) conventional additives in effective amounts, in particle form in aqueous suspension, is impregnated with (c) a blowing agent mixture consisting of
   (c1) aliphatic or cycloaliphatic saturated hydrocarbons of 3 to 7 carbon atoms and
   (c2) an aromatic saturated hydrocarbon of 7 or 8 carbon atoms,
      an alcohol of 2 to 4 carbon atoms,
      a ketone of 3 to 5 carbon atoms,
      a cyclic ether of 4 to 6 carbon atoms,
      an aliphatic ether of 4 to 6 carbon atoms,
      an ester of 4 to 6 carbon atoms and/or
      a chlorohydrocarbon of 1 to 2 carbon atoms and 2 or 3 chlorine atoms
at from 100° to 250° C. and under superatmospheric pressure.

* * * * *